United States Patent
Finney et al.

(10) Patent No.: US 7,870,595 B2
(45) Date of Patent: Jan. 11, 2011

(54) APPARATUS, METHODS, AND SYSTEM FOR ROLE-BASED ACCESS IN AN INTELLIGENT ELECTRONIC DEVICE

(75) Inventors: Dale Finney, Oshawa (CA); Jeffrey Mazereeuw, Newmarket (CA); Claudio Cargnelli, Toronto (CA); Donald Glenn Thompson, Guelph (CA)

(73) Assignee: General Electric Company, Schenectady, NY (US)

( * ) Notice: Subject to any disclaimer, the term of this patent is extended or adjusted under 35 U.S.C. 154(b) by 1048 days.

(21) Appl. No.: 11/617,050

(22) Filed: Dec. 28, 2006

(65) Prior Publication Data

US 2008/0162930 A1    Jul. 3, 2008

(51) Int. Cl.
*G06F 17/00* (2006.01)
*G06F 17/30* (2006.01)

(52) U.S. Cl. .................... 726/1; 726/3; 726/4
(58) Field of Classification Search ............ 726/1, 726/3, 4

See application file for complete search history.

(56) References Cited

U.S. PATENT DOCUMENTS

2005/0131583 A1    6/2005 Ransom

OTHER PUBLICATIONS

C37 (IEEE-IED standard), as printed out in year 2010.*
Decisive (SPP-ICSv1.0), as printed out in year 2010.*
EEI (EEI/AGA meeting of Sep. 2006), as printed out in year 2010.*
Summary (Summary of CS Standards), as printed out in year 2010.*
Electric (Cyber-Access Controls, North American Reliability Council), as printed out in year 2010.*
Study on Substation Control Interlocking Combined with PKI/PMI Based Access Security Method Bin Duan; Nian Liu; Shenglong Huang; Power System Technology, 2006. PowerCon 2006. International Conference on Publication Year: 2006, pp. 1-6.*
Data communication and information security analysis of wide area protection system Cheng Li; Li Zhongwei; Tong Weiming; Information and Automation (ICIA), 2010 IEEE International Conference on Publication Year: 2010, pp. 461-465.*
Study of information model for wide-area backup protection agent in substation based on IEC61850 Xiaoyang Tong; Xiaoru Wang; Li Ding; Electric Utility Deregulation and Restructuring and Power Technologies, 2008. DRPT 2008. Third International Conference on Publication Year: 2008, pp. 2212-2216.*

(Continued)

*Primary Examiner*—David Y Jung
(74) *Attorney, Agent, or Firm*—GE Global Patent Operation

(57) ABSTRACT

The present disclosure describes apparatus, methods, and system for secure access control of an intelligent electronic device ("IED") by multiple personnel. Within the IED a set of basic permissions is defined. A software program allows a security administrator create specific roles from the basic permissions. The software program can then be used to assign to a user a specific role for one or more specific IEDs. This action creates a set of unique security keys for the user and a unique security file for each IED. When a user accesses an IED the system identifies the user from the security key and determines his/her permissions using the security file. The security key may take the form of a password inputted into the IED, an access device incorporated within the IED, and/or a remote access device positioned proximate the IED or removably positioned in the IED.

22 Claims, 7 Drawing Sheets

OTHER PUBLICATIONS

Nian Liu et al: "Study on PMI based Access Control of Substation Automation System" Power Engineering Society General Meeting, 2006. IEEE Montreal, QC, Canada Jun. 18-22, 2006.

"Modernizing Your Substation? Visual Substation—designed for the power industry", cybectec, www.cybectec.com, http://www.cybectec.com/en/pd/Visual_Substation_flyer.pdf.

"GE Energy Announces Its D400 Substation Data Manager", Feb. 7, 2006, Tampa, FL., http://news.thomasnet.com/printready.html?prid=476237.

ANSI INCITS 359-2004 Information technology—Role Based Access Control Available from: http://webstore.anal.org/ansidostore/product.asp?sku=ANSI+INCITS+359%2D2004.

* cited by examiner

APPARATUS, METHODS, AND SYSTEM FOR ROLE-BASED ACCESS IN AN INTELLIGENT ELECTRONIC DEVICE

BACKGROUND

1. Field of the Invention

The present disclosure relates to power substations generally, and more particularly, to a new intelligent electronic device ("IED") for use in power substation control systems and to methods for granting role-based access to the new IED.

2. Discussion of Related Art

Power substations include primary equipment, such as transformers, capacitor banks, and generators; and secondary equipment, such as cables, switches, relays, protective equipment, and control equipment. Primary equipment is located in the substation yard and controlled via (fiber-optic and/or metallic) cables. Providing all weather protection and security for the control equipment, a substation control house contains switchboard panels, batteries, battery chargers, supervisory control equipment, power-line carriers, meters, and relays. Located within the control house, the switchboard control panels contain meters, control switches, and recorders used to control the substation equipment, to send power from one circuit to another, or to open or close circuits when needed.

In the past, hundreds of discrete electro-mechanical and/or solid-state control devices were needed to monitor and manage the operation of a single substation's primary equipment. Recently, microprocessor-based devices, called intelligent electronic devices ("IEDs"), have become popular, not only because a single IED can be programmed and configured to monitor and manage a variety of substation equipment, but also because new substations constructed using IEDs cost less to construct than substations constructed using electro-mechanical and/or solid-state control devices. Properly positioned and configured, an IED can receive and relay status signals from primary equipment to a master computer located in the control house. Additionally, an IED can receive and relay command signals from the master computer to the primary equipment.

Today, many companies are forced to maintain multiple IEDs for a single piece of power equipment, where each IED performs a separate function (or group of functions), so that a user servicing one IED does not interfere with functions performed by another IED, which is serviced by different user. Such an approach is not only unnecessarily redundant, but also expensive. Although beneficial in many regards, consolidating multiple functions within a single IED has its drawbacks. One disadvantage is that two or more people, each of whom has different experience levels, different roles, different responsibilities, etc., will need to access the IED for different purposes. It is thus important that one user's work be restricted only to the hardware/software portions of the IED that control/perform the functions which the user is permitted to service. Another problem faced by industry is that, once an action has been carried out on the IED, the identity and/or role of the person who undertook the action, cannot be determined. Yet another problem is that the users accessing the IEDs periodically change employers, as well as roles (e.g., engineer, senior engineer, etc.), which makes implementing and managing a role-based access system difficult.

What is needed is a new IED, as well as methods and systems for implementing and managing role-based access ("RBAC") to the IED that comply with ANSI INCITS 359-2004 Information technology—Role Based Access Control standard. "ANSI" refers to the American National Standards Institute. "INCITS" refers to the International Committee for Information Technology Standards. The 359-2004 standard describes RBAC features that have achieved acceptance in the commercial marketplace and is available on the Internet at http://webstore.ansi.org. The standard includes a reference model and functional specifications for the RBAC features defined in the reference model.

BRIEF DESCRIPTION

The present disclosure describes apparatus, methods, and systems for secure access control of an intelligent electronic device ("IED") by multiple personnel, which conform to the principles of role-based access ("RBAC") as defined in ANSI INCITS 359-2004 (no person shall have more privileges than necessary to perform his/her job).

The RBAC apparatus, methods, and systems described herein support multiple permission, multiple users, and multiple IEDs. In a non-limiting embodiment, about 21 basic permissions, about 32 individual users, and about 5,000 IEDs may be simultaneously supported. Exemplary permissions are explained in more detail below. An RBAC system is defined in terms of individual users being assigned to roles, and roles being built up from basic permissions. As such, a role is a means for naming many-to-many relationships among individuals and permissions.

In an embodiment, an RBAC system comprises an IED having a microprocessor, a computer coupled to the IED microprocessor via a network, and one or more software programs executable by the IED microprocessor and the computer. Within the IED a set of basic permissions is defined, either in firmware and/or software. Alternatively, the set of basic permissions may be defined by a software program executable by the computer. The same or different software program allows a security administrator create specific roles from the basic permissions. The software program can then be used to assign to a user a specific role for one or more specific IEDs. This action creates a unique security key for the user and a unique security file for each IED. The new or updated unique security files may be transmitted to the IEDs over a network that connects the IEDs to the computer. When a user subsequently accesses an IED using their security key, the user's unique code/password is identified and compared to the IED security file to determine the user's permissions.

The security key may take the form of a password remembered by the user and inputted locally through the IED keypad or through a computer connected to the IED. The security key may also be stored on a magnetic-strip card (similar to a debit card), a proximity type security card, a USB type memory device, or an embedded-processor smart card. In each case the security key is transferred to the IED using an appropriate reader incorporated within the IED or positioned proximate to the IED or removably positioned in the IED. The security key may also take the form of a person's biometric information that is transferred to the IED by an appropriate reader.

The new IED, methods, and systems offer several advantages. One advantage is that a user servicing the new IED can be restricted (via a role-based access system and method) to only the hardware/software of the IED that performs the functions the user is authorized to service. As a result, multiple power substation control functions (or other types of functions) can now be safely consolidated into the new IED. This reduces the cost of constructing power substations, since one IED can be used to manage multiple pieces of power equipment. Another advantage is that the new IED is now more secure than prior IEDs. The new IED includes an integrated user identification device, which all but eliminates unauthorized access to the IED. Additionally, access logs are kept that record each access, or attempted access. Yet another advantage is that the new systems and methods for providing role-based access to the new IED are scalable and deployable across a network of IEDs, which makes managing roles easy. Other advantages are that IED security configurations can be managed by site; that update of IED security configurations is automated; and that user privileges can be managed by role.

In an embodiment, a method may comprise a step of generating a role for a user of an intelligent electronic device ("IED"). The method may further comprise a step of generating a user assignment. The method may further comprise a step of generating a site assignment. The method may further comprise a step of generating a user security key and an associated security file based on data output from at least one of the steps of generating a role, generating a user assignment, and generating a site assignment.

In another embodiment, a method may comprise a step of receiving an action request. The method may further comprise a step of checking a received user key against a security file. The method may further comprise a step of executing an action if permission is granted as a result of the checking step. The method may yet further comprise a step of generating an unauthorized access alarm if permission is denied as a result of the checking step.

In another embodiment, an apparatus may comprise a microprocessor and a circuit managed by the microprocessor. The circuit may be configured to control operation of substation equipment. The apparatus may further comprise a memory coupled with the microprocessor and a role-based access ("RBAC") mechanism that can be executed by the microprocessor to grant or deny user access to the IED.

In another embodiment, a system may comprise an intelligent electronic device ("IED") configured to allow role-based access to a user of the IED. The system may further comprise a network, and a remote computer coupled to the IED via the network. The remote computer may be configured to transmit an IED security file to the IED. The IED security file may comprise a unique security code/password that is associated with a role comprised of one or more permissions.

Other features and advantages of the disclosure will become apparent by reference to the following description taken in connection with the accompanying drawings.

BRIEF DESCRIPTION OF THE DRAWINGS

For a more complete understanding of an intelligent electronic device ("IED") configured as described herein, and the advantages thereof, reference is now made to the following descriptions taken in conjunction with the accompanying drawings, in which.

Like reference characters designate identical or corresponding components and units throughout the several views.

DETAILED DESCRIPTION

Figure 1:
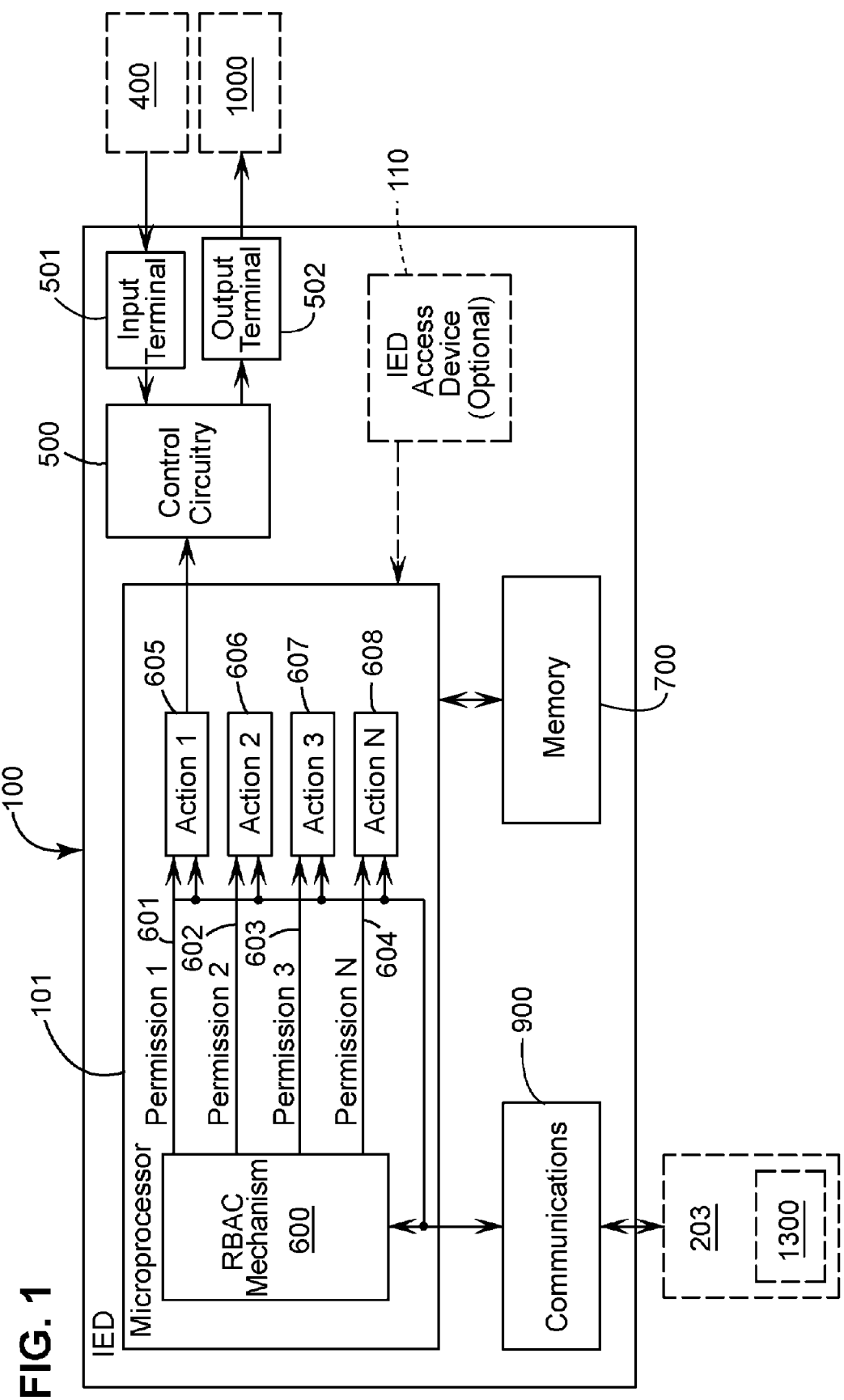
FIG. 1 is a block diagram of a new IED having a role-based access ("RBAC") mechanism incorporated therein.

FIG. 1 is a block diagram of an intelligent electronic device ("IED") 100 configured for role-based access ("RBAC"). Embodiments of the new IED 100 can be used in any suitable application, a non-limiting example of which is an electrical power substation.

Referring to FIG. 1, an embodiment of the IED 100 includes a microprocessor 101, control circuitry 500 coupled to the microprocessor 101, an input terminal 501 coupled to the control circuitry, an output terminal 502 coupled to the control circuitry 500, a role-based access mechanism 600 configured to be executed by the microprocessor 101, a memory 700 coupled with the microprocessor 101, and a communicator 900 coupled with the microprocessor 101. The RBAC mechanism 600 may be embodied as firmware and/or computer software. The communicator 900 may be any type of communication device suitable for transmitting data between the IED and the remote master computer. Modems, wireless transceivers, as well as data ports (e.g., Ethernet connectors, USB drives, etc.) are non-limiting examples of a communicator 900.

A power source 400 connected to the IED input terminal 501 provides current necessary to operate the IED 100. The power source 400 may be one or more power substation batteries, one or more fuel cells, a generator, and the like that are capable of producing power in the illustrative range of about 125 Volts to about 250 Volts DC. Additionally or alternatively, the IED 100 may include an internal power source, such as a battery (not shown).

Substation equipment 1000 to be monitored and/or controlled by the new IED 100 is connected to the IED output terminal 502. A circuit breaker and a motor-operated switch are non-limiting examples of substation equipment 300.

A master computer 203 having a digital fault recorder ("DFR") 1300, which monitors operation of the IED and/or the substation equipment 300 and logs fault events, may be coupled to the communicator 900.

The microprocessor 101 is configured to control the current flow and voltage levels in the circuit(s) 500, and the circuit(s) 500 are configured to control operation of the substation equipment 300. The memory 700 stores computer-executable instructions that when processed by the microprocessor 101, cause the microprocessor 101 to perform one or more method steps described herein. The memory 700 may also store RBAC information for use by the microprocessor 101. As further explained below, RBAC information that may be stored in the memory 700 may include a security file, which is used to identify a user and to grant the user one or more predetermined access privileges to the IED. An optional access device 1100 may be incorporated within the IED 100, and coupled with the microprocessor 101. As further described herein, the access device 1100 may be configured to receive a security key from a user of the IED, and further configured to relay the security key to the microprocessor 101 for processing and/or comparison with a security file retrieved by the microprocessor 101 from the memory 700. The security key may contain one or more permissions that are uniquely associated with a role that has been assigned to the IED user.

The types of permission(s) 601, 602, 603, and 604 associated with the security key may be determined from the processing and/or comparison steps. When performing the processing and/or comparison steps, the microprocessor 600 may execute the RBAC mechanism 600. Depending on what permission(s) 601, 602, 603, and 604 is/are associated with the security key, execution of the RBAC mechanism 600 may cause one or more signals representing one or more actions 605, 606, 607, 608 to be output from the microprocessor 101 to the control circuitry 500. In turn, signals output from the control circuitry 500 grant (or deny) RBAC access to the user of the IED and/or output signals to the substation equipment 300.

The access device 1100 may be any suitable type of device configured to identify a user of the IED from a security key. Non-limiting examples of an access device 1100 include a magnetic-strip card reader (and/or a magnetic strip card), a proximity type security card reader (and/or a proximity type security card), a USB type memory device, an embedded-processor smart card. In each case the security key is transferred to the IED using an appropriate reader incorporated within the IED or positioned proximate to the IED or removably positioned in the IED. Other non-limiting examples of an access device 1100 that may be coupled with or integrated within an IED 100 include a keypad, a data port, a digital display, a radio frequency identification ("RFID") reader, a biometric device (e.g., fingerprint scanner, voice recognizer, etc.), combinations thereof, and the like.

Figure 2:
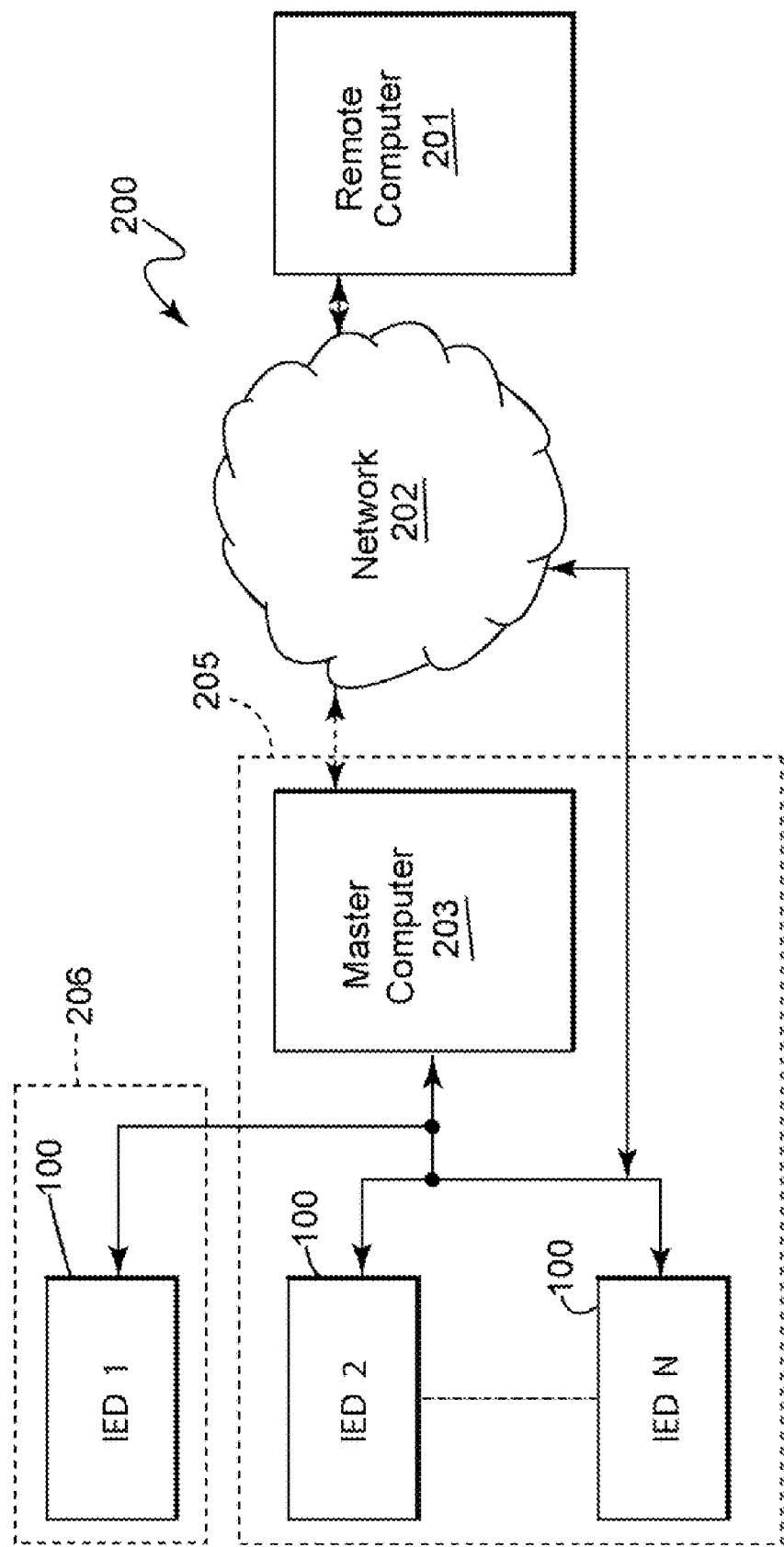
FIG. 2 is a block diagram of a system for providing role-based access to one or more IEDs configured as shown and described herein.

FIG. 2 is a block diagram of a high-level view of a power substation environment 200 in which one or more new IEDs 100 may be implemented. As shown, a new IED 100 may be located in a substation yard 206. Other IEDs 100 may be located in a substation control house 205. Regardless of their locations, the IEDs 100 are each coupled to a master computer 203, which may be located in the control house 205, via a local area cable or encrypted wireless network. Additionally, each of the ILEDs 100 may optionally be coupled, via local or wide area network 202, to the remote computer 201. Alternatively referred to as a "security configuration tool," the remote computer 201 may reside in a secure location at a substation management facility. The remote computer 201 may execute a RBAC software program that enables an administrator to create and transmit RBAC identification keys and security files to one or more IEDs. The master computer 203 may optionally be coupled, via a network 202 to the remote computer 201. Either the master computer 203 or the remote computer 201 may be used to configure and/or modify the configuration of the RBAC mechanism 600 in each of the IEDs 100.

In an embodiment, the master computer 203 may be a data manager, such as the D400 series of data manager manufactured by the General Electric Company of Fairfield, Conn. A data manager, such as the D400, integrates data from a wide range of IEDs and offers network security that includes user authentication, data encryption, a secure terminal server, and a secure sockets layer/virtual private network. It may also provide automated fault record management, integrated human-machine-interface ("HMI") functionality, control sequence programming, browser-based local and remote display and configuration support, and substation local area network support.

In an embodiment, each IED 100 is manufactured to include security features that are implemented in the firmware and/or software. Preferably, these security features can only be configured using a RBAC computer program resident on the remote computer 201 or through other components of a RBAC security management system. The security for a newly manufactured IED 100 may be disabled by default to allow full access an IED when it is received from the factory. Once security has been enabled, a user must have a unique type of permission to modify the IEDs security configuration.

A plurality of unique passwords may be configured for each IED. In one embodiment, each new IED 100 may handle 32 unique passwords (not including factory service). Password functionality is configurable according to the basic permissions set forth in Section A, which forms an integral part of this disclosure. A first password may be pre-configured to allow a user to perform LOAD, RECORD RETRIEVAL & DELETION permissions. A second password may be pre-configured to allow a user to perform permissions associated with control of substation equipment. Non-limiting examples of control-type permissions include: OPEN/CLOSE, TAG, SUBSTITUTE, BYPASS INTERLOCKS, and the like. The remainder of the plurality of passwords are preferably not preconfigured (e.g., the privileges associated with each of these remaining passwords are disabled by default). When the IED security is enabled, any passwords with enabled privileges will immediately generate prompts to enter new passwords. Thus, a user will be prompted to enter new passwords to replace the default first and second passwords described above. If any privileges are enabled for the remainder of the plurality of passwords, the user will be prompted to enter new passwords for the affected password.

The security function of each IED 100 is either enabled or disabled. If enabled, a password is required for critical actions. How a user accesses a new ILED 100 will vary depending on how the IED 100 is configured. Non-limiting examples of means for accessing an IED 100 include a keypad, a S-Key (e.g., a USB compatible or wireless device carried by the user, which stores and transmits the user's unique security code and/or role to the IED 100), and combinations thereof. Additionally, the time during which a password may be accepted when supervised access (defined in Section A) is enabled may be set in steps of an hour in a range of about 0 hours to about 12 hours. Also, the IED 100 may include a pre-determined inactivity limit, which sets the duration of inactivity before which a password may be re-entered. Inactivity may be defined as no buttons pressed (or S-Key inserted or wirelessly activated) during local access or no data transfer during remote access.

An IED's password entry setting determines how a password entry is carried out. If a KEYPAD setting is selected, then the password is entered manually from a front panel human machine interface ("HMI"), using a keypad of a data manager, or (optionally) using a keypad incorporated into the IED itself. If a S-KEY setting is selected, then the password is read automatically from the user's S-Key. In an embodiment, an S-Key is a magnetic-strip card or a removable USB thumb-drive. In alternative embodiments, the S-Key is a password that is remembered and entered by a user into a keypad or voice-recognition device. In yet other embodiments, the S-Key is biometric information (e.g., fingerprint information, voice information, etc.) provided by an IED user.

In an embodiment where access is local (e.g., a user is proximate the IED), the S-Key may be either inserted into a USB port of the IED 100 or brought proximate the IED's wireless reader. If access is remote, the S-Key may be inserted into a USB drive of the remote computer 201 that runs a RBAC software program. Alternatively, the S-Key may be brought proximate the remote-computer's wireless reader, if the remote computer 201 is so equipped. If KEYPAD and S-KEY is chosen, the user is required to both insert (or swipe) the S-Key and enter a valid password.

If the ACCESS setting described above for one or more new IEDs 100 has been configured as S-KEY or KEYPAD & S-KEY, the IED's security file (which is stored in the IED memory 700) must be configured with the S-KEY unique code/password that will grant a user role-based access to the IED(s) 100. A RBAC software program executed by the remote computer 201 (in FIG. 2) and/or the IED microprocessor 101 (in FIG. 1) may be used to configure, transmit, decode, and/or verify the S-KEY unique code/password.

In an embodiment, when a remote computer 201 is used to access a RBAC software program configured as described herein, a list of IEDs 100 that have been previously configured for S-Key security may be displayed. From the list, an administrator can designate one or more of the S-Key enabled IEDs 100 to receive security file information containing a unique S-Key code/password that is linked to a user name and a user role. In an embodiment, the security file is a computer-readable data file generated by the RBAC software program and comprised of rows and columns. Each row in the security file may represent one of the plurality of IED password entries. Columns in the security file may include: S-KEY CODE/PASSWORD, USER NAME, ROLE, and PERMISSIONS. When a S-Key code/password is input to an IED 100 (remotely or locally), the S-KEY CODE/PASSWORD column of the security file is searched by the IED microprocessor 101 until a search is found (or not). If a match occurs, the IED microprocessor 101 reads the data in the matched row to determine the user's identity, role, and associated permissions, and the user is granted access to the IED 100.

Knowing this, the administrator selects an available IED password number entry row (e.g., Password 3 or higher since Passwords 1 and 2 are reserved as described above). The administrator then inserts an S-Key on which a user name, alphanumeric (or biometric) password, and role information have been previously stored into the USB port of the remote computer 201 (or swipes the S-Key proximate a wireless reader), and instructs the remote computer 201 to execute a CONFIGURE USER command. This action populates the security files of the selected IEDs with the User Name, S-Key code/password, role, and (optionally) permissions stored on the now activated S-Key. This action may also transmit and stores the new or updated IED security files of all of the selected IEDs 100.

One or more predetermined error messages may be displayed if the S-Key is not properly inserted within the USB port of the remote computer 201 or is not sufficiently proximate a wireless reader of the remote computer 201. Other error messages may be displayed if one or more of the selected IEDs has not been configured to accept passwords. An acceptance message may be displayed if the security files all the selected IEDs 100 have been successfully configured.

Figure 3:
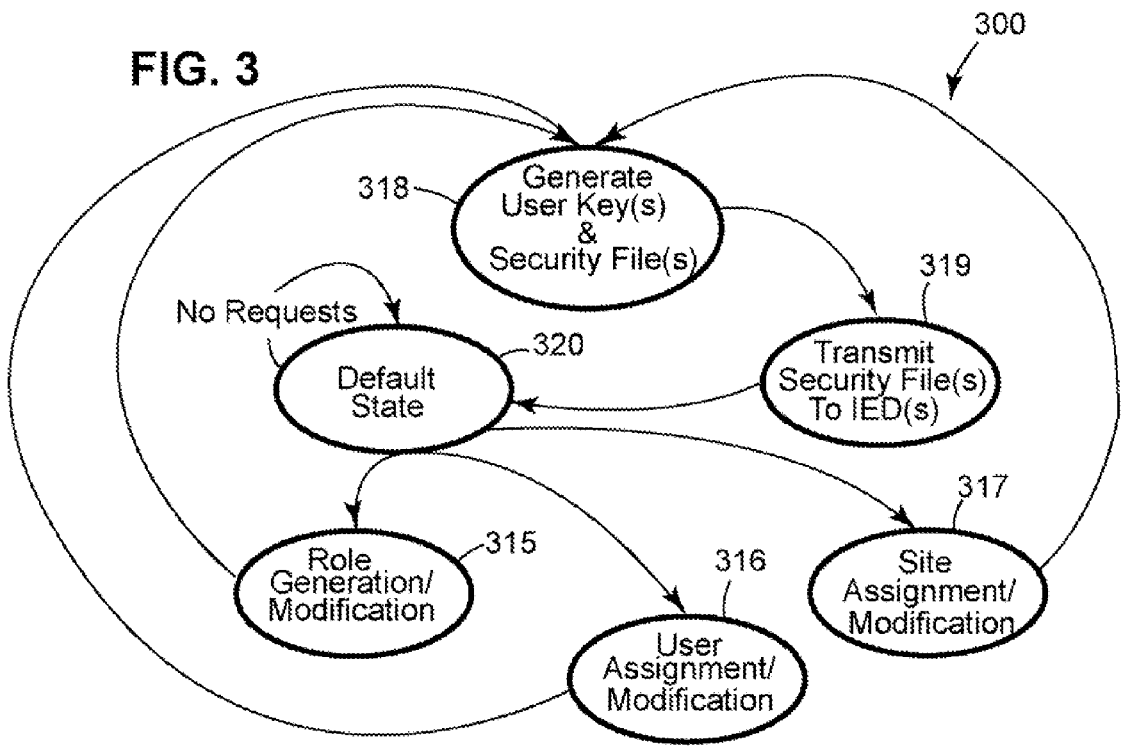
FIG. 3 is a flowchart of a method that may be used to configure an IED for role-based access.

FIG. 3 is a flowchart illustrating an embodiment of a method 300 of configuring one or more IEDs 100 and/or users to perform RBAC. The method 300 is described first at a high level, and then in more detail with respect to FIGS. 4, 5, and 6. It is understood that the steps of method 300 may be executed by a computer processor to generate/configure user security keys and associated security files. It is further understood that the steps of the method 300 may be performed in any suitable order.

Referring now to FIG. 3, the method 300 may begin at the default state 320. If no requests to generate/modify user roles, user assignments, or site assignments are received, the method 300 may continuously loop back through the default state 320. The method 300 may begin at any of steps 315, 316, or 317. At step 315, for example, the method 300 includes defining one or more roles. As explained in more detail below, roles can be built up from one or more predetermined basic permissions (shown in Table 1). At step 316, the method 300 includes generating/modifying user assignments. At step 317, the method 300 includes generating/modifying site assignments. The data resulting from each of the steps 315, 316, and 317 is used by the computer processor and RBAC computer software at a step 318 of generating/modifying user S-Keys and associated security files. At step 319, the method 300 includes encoding and transmitting the security files generated/modified at the step 318 to the IEDs. Following step 319, the method 300 may return to the default ready state 320.

Figure 4:
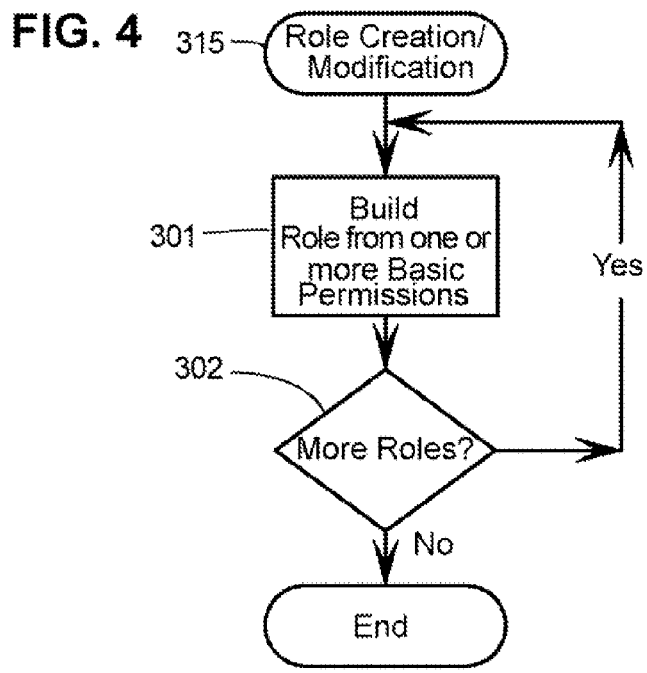
FIGS. 4, 5, 6 are flowcharts illustrating substeps associated with the method of FIG. 3.

FIG. 4 is a flowchart illustrating substeps associated with a step of the method 300 of FIG. 3. As shown in FIG. 4, the step 315 of generating/modifying user roles may include two substeps 301 and 302. At step 301, a role is built from one or more basic permissions, examples of which are shown below in Table 1. At step 302, it is decided whether additional user roles should be generated/modified. If yes, the method 300 loops back to repeat steps 301 and 302. If no, the method 300 may end.

Figure 5:
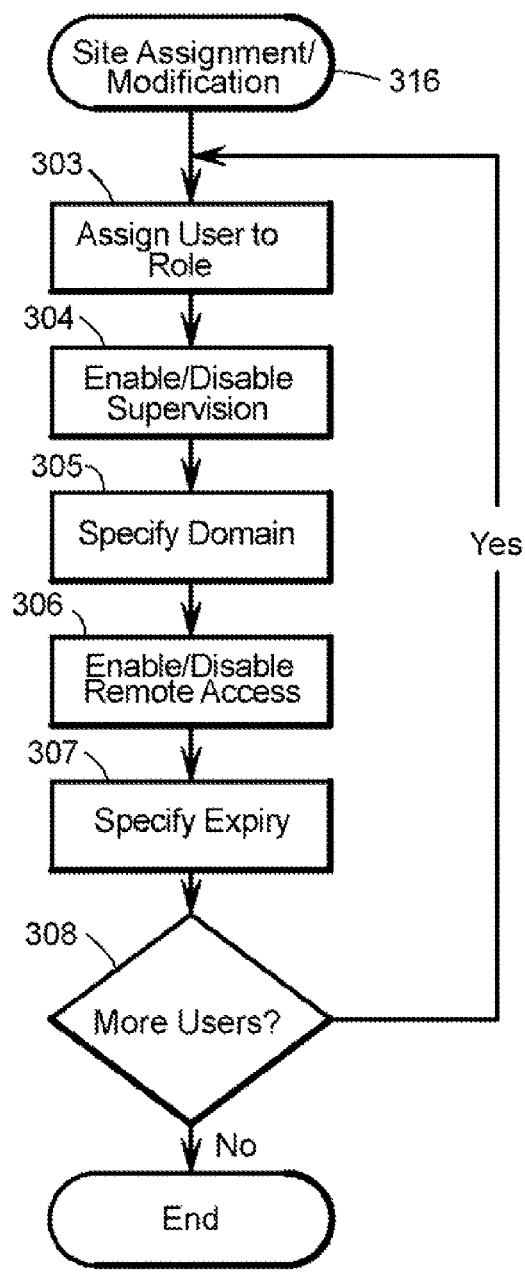

FIG. 5 is another flowchart illustrating substeps associated with a step of the method 300 of FIG. 3. As shown in FIG. 5, the step 316 of generating/modifying user assignments may include several substeps 303, 304, 305, 306, 307, and 308. At step 303, a user name is assigned to a particular user role. At step 304, supervision is enabled or disabled. If the supervision function is enabled, the user will need to request a window of time from a system operator in which to access an IED. At optional step 305, a domain is specified (e.g., the window of time is designated). At step 306, remote access may be enabled or disabled. If remote access privileges are enabled, the user will be able to access the IED via a computer that communicates with the IED over a network. At step 307, an expiry setting (e.g., expiration date) may be designated, at which time the user loses one or more privileges that comprise the role. At step 308, it is determined whether one or more user assignments should be generated/modified. If yes, the method 300 loops back and repeats the steps 303, 304, 305, 306, 307, and 308. If no, the method 300 may end.

Figure 6:
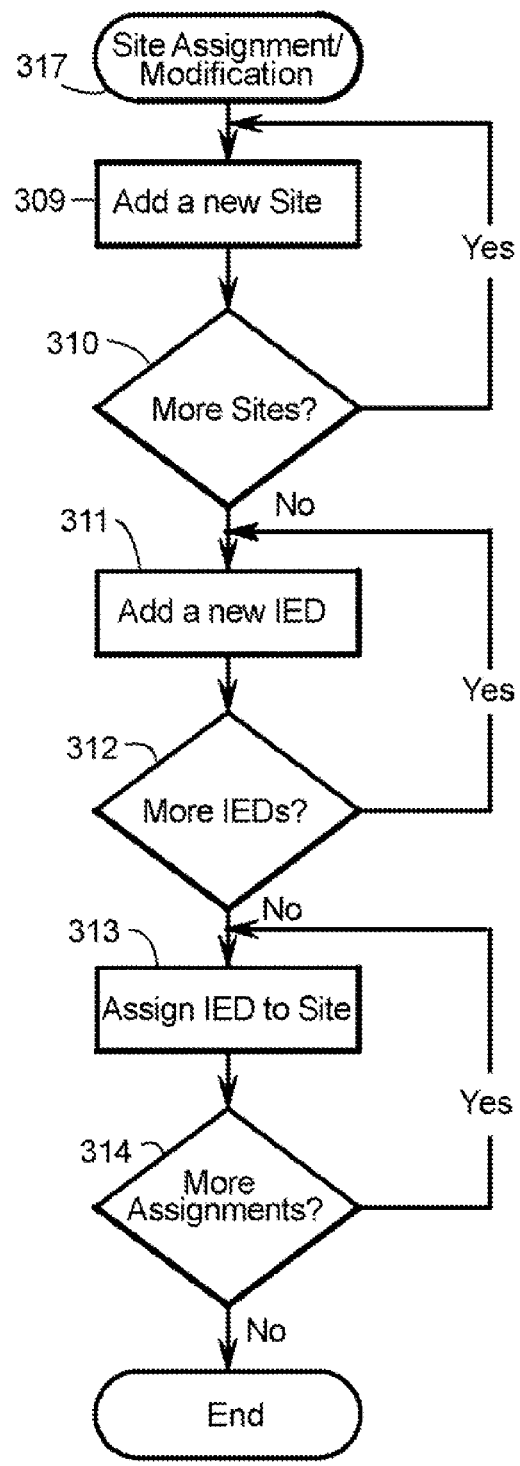

FIG. 6 is another flowchart illustrating substeps that may be associated with a step of the method 300 of FIG. 3. As shown in FIG. 6, the step 317 of generating/modifying site assignments may include the substeps 309, 310, 311, 312, 313, and 314. At step 309, a new site (e.g., a power substation or area thereof) may be added to the RBAC system by entering and/or storing data that uniquely identifies the site. At step 310, it is determined whether more sites should be added/modified. If yes, the method 300 loops back and repeats steps 309, 310. If no, the method proceeds to the step 311 of adding a new IED profile to the RBAC system. This may be accomplished by entering and/or storing data that uniquely identifies a particular IED. At step 312, it is decided whether additional IED profiles should be added/modified. If yes, the method 300 loops back and repeats the steps 311 and 312. If no, the method 300 proceeds to a step 313 of assigning an (added) IED profile to a particular site. The step 313 involves associating data about a particular IED with data about a particular geographic location (e.g., a power substation or area thereof). At step 314 it is decided whether additional IED profiles should be assigned to the same and/or additional sites. If yes, the method 300 loops back and repeats the steps 313 and 314. If no, the method 300 may end.

Figure 7:
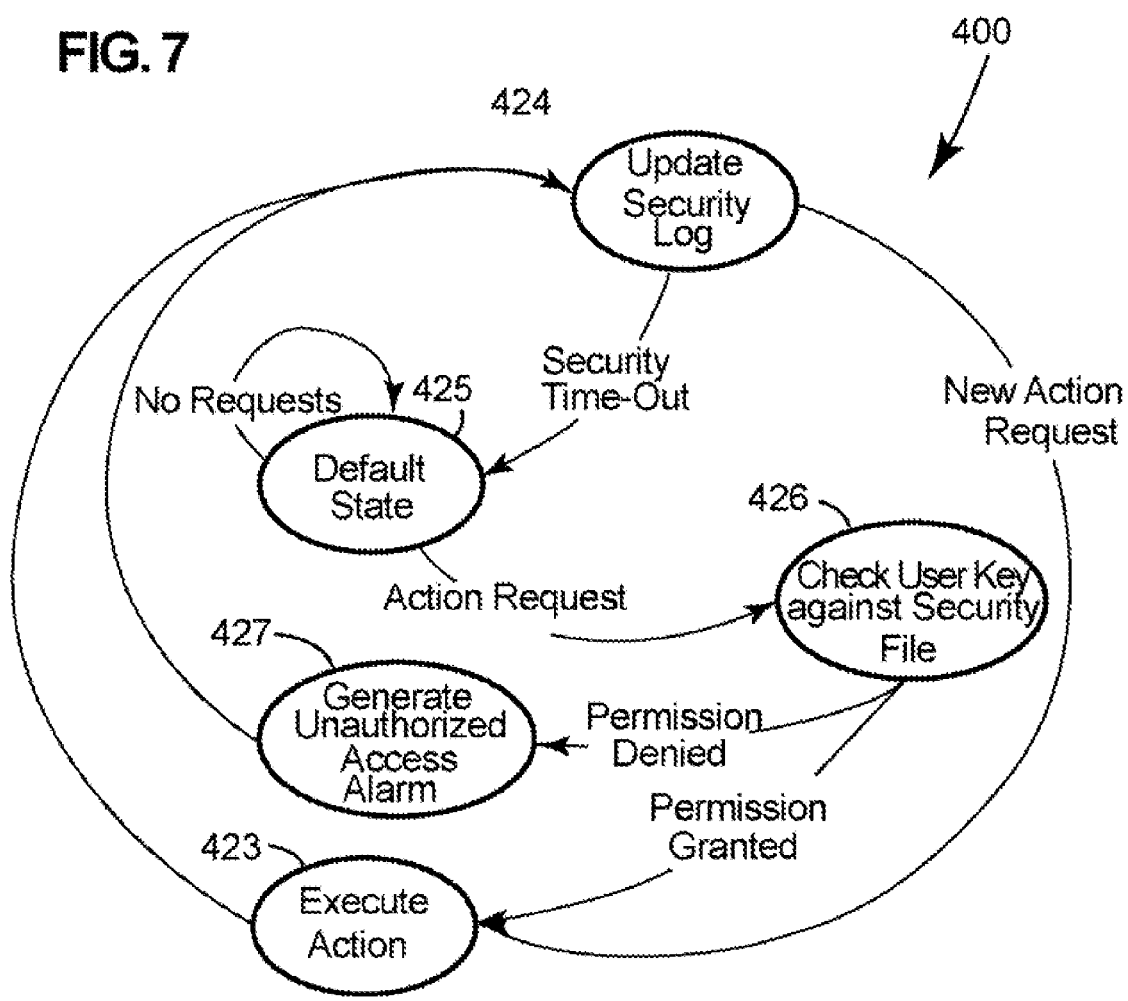
FIG. 7 is a flowchart illustrating a method that may be performed by an IED that is configured as shown and described herein to perform role-based access.

FIG. 7 is a flowchart illustrating a method 400 of operating a RBAC mechanism 600 of the IED 100 of FIG. 1. Referring to FIGS. 1 and 7, the method 400 may begin at a default state 425. If no requests are received, the method 400 may continuously loop back to the default state 425. When an action request is received, the method 400 may proceed to a step 426 of checking a received user security key against a security file retrieved from a computer-readable memory 700. In an embodiment, the action request may be automatically generated when a security key is received as described above (e.g., manually inputted password, swiped magnetic-strip security card, measured biometric information, activated proximity security card, etc.). A result of the step 426 is a determination that permission to access the IED is granted or that permission to access the IED is denied. If permission is granted, the method 400 may proceed to a step 423 of executing one or more actions associated with the type of permission that has been granted. If permission is denied, the method 400 may proceed to a step 427 of generating an (silent or audible) unauthorized access alarm. Following either of steps 423 or 427, the method 400 may proceed to a step 424 of updating a security log. The step 424 may include storing data relating to the executed action(s) or data relating to a generated unauthorized access alarm. Non-limiting examples of such data include, user name, time/date, type of action(s) requested/performed, user roles/permissions, and the like. Once the security log has been updated (and stored), the method 400 may either time-out or proceed to execute a new action request. If a new action is requested, the method 400 may proceed to repeat the step 423 of executing the action and the step 424 of updating the security log. If a time-out occurs, the method 400 returns to the default state 425.

Table 1 is a non-limiting example of basic permissions that may be found in an IED. Such examples will be readily understood by a skilled artisan, and are thus not defined further.

TABLE 1

| Permission Groups | Basic Permissions |
| --- | --- |
| Protection | Configuration |
| | Load |
| Automation | Configuration |
| | Load |
| | Open/Close |
| | Tag |
| | Substitute |
| | Bypass Interlocks |
| Equipment Manager | Configuration |
| | Load |
| | Delete records & reset statistical values |
| DFR | Configuration |
| | Load |
| | Delete records |
| Communications | Configuration |
| | Load |
| Security | Configuration |
| | Load |
| | Retrieval of Audit Trail |
| Metering | Configuration |
| | Load |
| | Delete records & reset statistical values |
| | Firmware Upgrade |
| | Test Mode |

A list of such high-level permissions may be displayed by the remote computer 201 (in FIG. 2). An administrator viewing this list may create user roles (step 301) by designating one or more of the high-level permissions.

One or more user roles may be built up from basic permissions, of the types shown in Table 1. In an embodiment, the RBAC computer program, which may be executed by the remote computer 201, may include one or more preconfigured high-level roles (e.g., P&C ENGINEER, SYSTEM OPERATOR, MAINTENANCE TECHNICIAN, and the like). Additionally, new roles can be created, and existing roles can be modified. Accordingly, the following role-related functions are provided. The command ADD ROLE adds a new role to the system and prompts the administrator to enter a user name. After the user name is entered, a list of basic permissions, permission groups, and existing roles is displayed. The administrator may assign any or all of the items from this list to the new role. The command MODIFY ROLE makes changes to an existing role. Accordingly, it may be used to rename the role or change its permission assignments. The command DELETE ROLE removes a role from the system. The command DISPLAY ROLES creates a graphic display of the previously created roles and their associated permissions.

Figure 8:
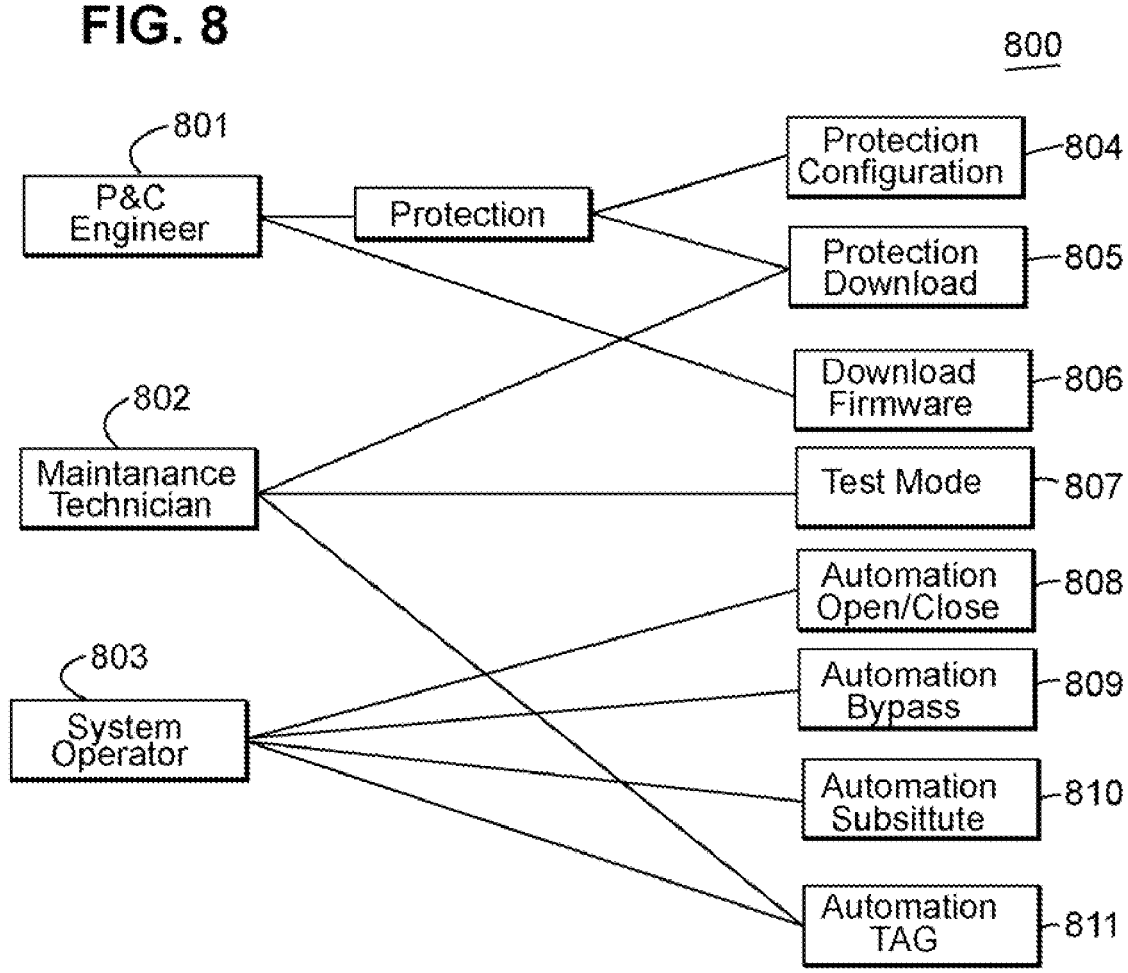
FIG. 8 is a block diagram illustrating how users may be assigned various roles for accessing an IED that is configured as shown and described herein to perform role-based access.

FIG. 8 is a graphical display 800 of exemplary roles 801, 802, and 803, and their associated permissions 804, 805, 806, 807, 808, 809, 810, and 811. Illustratively, role 801 (P& C Engineer) is associated with permissions 804 (Protection Configuration), 805 (Protection Download) and 806 (Download Firmware). Additionally, role 802 (Maintenance Technician) is associated with permissions 805, 807 (Test Mode), and 811 (Automation Tag). Similarly, role 803 (System Operator) is associated with permissions 808 (Automation Open/Close), 809 (Automation Bypass), 810 (Automation Substitute), and 811.

The RBAC computer program executed by the remote computer 201 may also display a listing of sites and the IEDs located at each site. It may also permit sites and/or IEDs to be added, modified, or removed. Each site may be assigned a predetermined unique site identification number. Similarly, each IED may be identified by its unique serial number.

After roles have been defined and assigned (step 301) and IEDs have been configured, users may be added to the system (step 308). As previously mentioned, this process generates a security file for one or more security enabled IEDs. Accordingly, the RBAC computer program executed by the remote computer 201 may provide the following functions. The ASSIGN DOMAIN function allows an administrator to assign a user access to all or some of the IEDs in the system. The ASSIGN SUPERVISION function determines whether a user has independent access (supervision disabled) or dependent access (supervision enabled) to the IEDs. If supervision is enabled, then the user is supervised by a system operator via SCADA. For example, a user with supervised privileges would contact the system operator prior to changing the relay configuration. The operator sends a command via SCADA to the IED to be configured. This command opens a window of time during which the user can load a new configuration setting to the affected relay.

The ASSIGN REMOTE ACCESS function allows an administrator to choose whether to grant a user remote access to an IED. This would allow the user to access and configure the IED via a computer from afar. In an embodiment, a user may be granted remote access privileges only for CONFIGURE MONITOR and SECURITY permissions, but not for OPERATE and TEST permissions.

The ASSIGN EXPIRATION function determines whether user privileges (and/or roles) are permanent or expire after a specified date. This date (expiry setting) prompts the RBAC computer program executed by the remote computer 201 to automatically remove users from the system. Additionally, the expiry setting is written to the IED security file to allow the IED to lockout users with expired control privileges.

Figure 9:
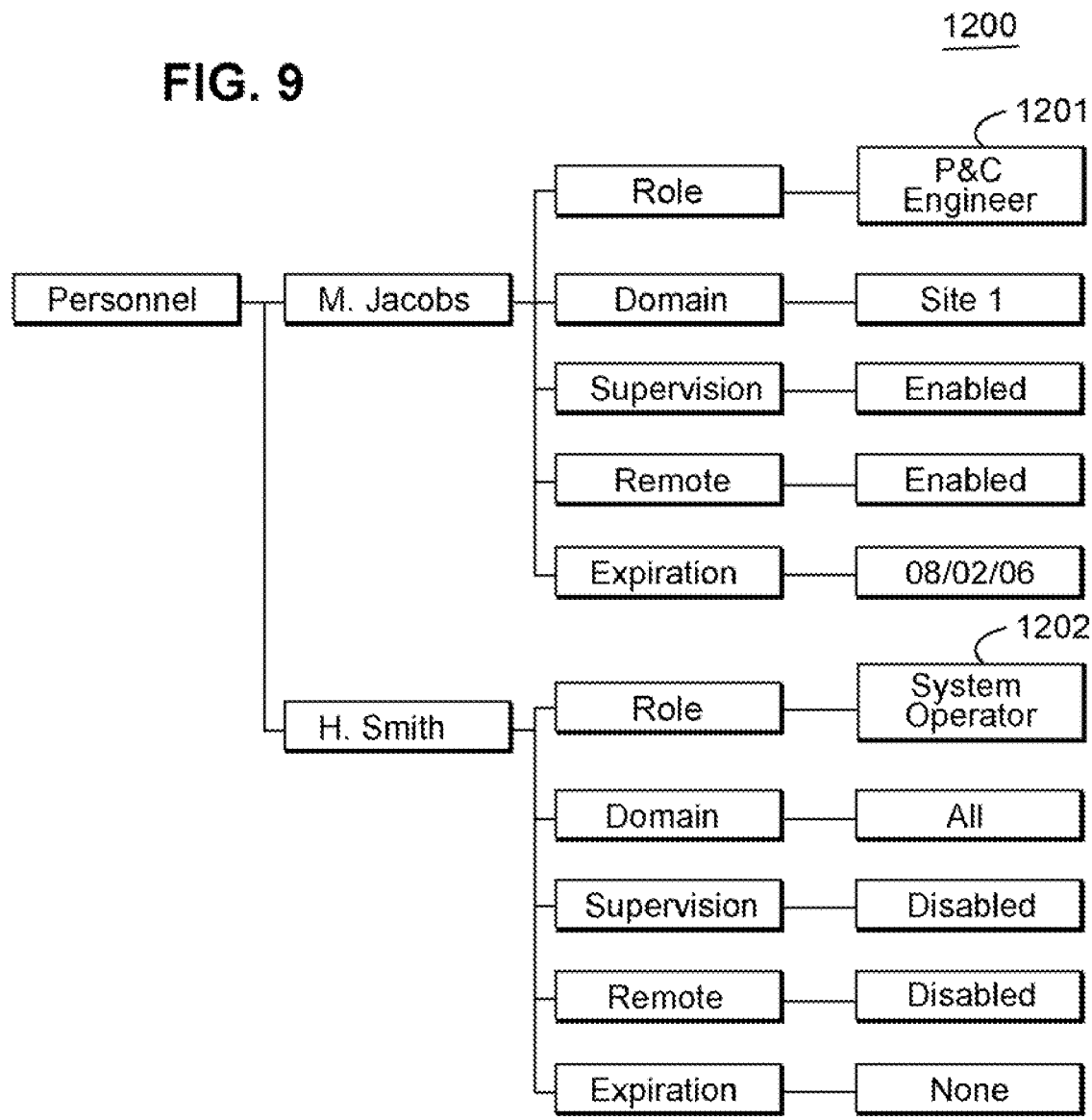
FIG. 9 is a block diagram further illustrating how users may be assigned various roles for accessing an IED that is configured as shown and described herein to perform role-based access.

FIG. 9 provides an example of a personnel setup 1200, in which two users (M. Jacobs and H. Smith) are respectively assigned different roles 1201 (P&C Engineer) and 1202 (System Operator). In this non-limiting example, M. Jacobs has supervised access and remote access only to Site 1, whereas H. Smith has unsupervised access and no remote access to all sites. Additionally, M. Jacobs' privileges have an expiry setting of Aug. 2, 2006, whereas H. Smith's privileges never expire (e.g., expiry setting is "none").

Attention is now directed to methods of accessing an IED 100 configured according the principles described herein. As previously mentioned, an IED 100 may be accessed using a HMI, through a first data port (local access), and/or through a second data port (remote access). In an embodiment, the first and second data ports are USB ports, but other types of data ports (e.g., wireless) may be used. If an IED 100 is accessed via the HMI 305, the various IED-related screens and/or commands may be navigated without password prompts. When an action defined in Table 2 is attempted and Security has been enabled in the IED 100 then the IED 100 will require a password before the action is processed.

Non-limiting examples of password prompt locations for local access via the front panel HMI of an IED 100 are shown in Table 3.

TABLE 2

Front Panel HMI Password Prompt Locations

| Screen | Button |
| --- | --- |
| Equipment Manager/Circuit Breaker Health | Baseline, Reset |
| Equipment Manager/Circuit Breaker Operation | Delete |
| DFR/Transient Record | Retrieve, Delete |
| DFR/Disturbance Record | Retrieve, Delete |
| DFR/Fault Report | Retrieve, Delete |
| Metering/Demand | Reset |
| Metering/Energy | Reset |
| Data Logger Record | Delete |
| Data Logger Alarms/Statistics | Reset |
| Open/Close/Tag/Substitute/Bypass | Breaker 1-2, Disconnect 1-6, AR, L/R |
| Maintenance/Summary | Test Mode Enable/Disable |
| Maintenance/Summary/Load | Upgrade Firmware, Upgrade Settings |

When an action in Table 2 is requested, the IED 100 may respond as follows: If the Access Method is S-Key and a valid S-Key is inserted in the S-Key port then the action is carried out without prompts. Alternatively, if the Access Method is S-Key and no S-Key is inserted in the S-Key port then a popup window prompting the user to insert an S-Key may be displayed. If no S-Key is inserted within a predetermined amount of time then the action is cancelled.

Non-limiting examples of password prompt locations for local access via a first data port of an IED 100 are shown in Table 3.

TABLE 3

Password Prompt Locations for IED Local Access

| Screen | Command |
| --- | --- |
| Equipment Manager/Circuit Breaker Health | Baseline, Reset |
| Equipment Manager/Circuit Breaker Operation | Delete |
| DFR/Transient Record | Retrieve, Delete |
| DFR/Disturbance Record | Retrieve, Delete |
| DFR/Fault Report | Retrieve, Delete |
| Metering/Demand | Reset |
| Metering/Energy | Reset |

TABLE 3-continued

Password Prompt Locations for IED Local Access

| Screen | Command |
| --- | --- |
| Data Logger Record | Delete |
| Data Logger Alarms/Statistics | Reset |
| Maintenance/Summary | Test Mode Enable/Disable |
| Maintenance/Summary/Upgrade | Upgrade Firmware, Load Settings |

Similarly, non-limiting exemplary password prompt locations for remote access of an IED 100 are listed in Table 4.

TABLE 4

Remote Password Prompt Locations

| Screen | Command |
| --- | --- |
| Equipment Manager/Circuit Breaker Health | Baseline, Reset |
| Equipment Manager/Circuit Breaker Operation | Delete |
| DFR/Transient Record | Retrieve, Delete |
| DFR/Disturbance Record | Retrieve, Delete |
| DFR/Fault Report | Retrieve, Delete |
| Metering/Demand | Reset |
| Metering/Energy | Reset |
| Data Logger Record | Delete |
| Data Logger Alarms/Statistics | Reset |
| Maintenance/Summary/Load | Upgrade Firmware, Load Settings |

Section A—Glossary Relating to Configuration of an IED

This section provides the following exemplary definitions:

Encrypted Password Setting—Refers to an encrypted value of the current password. Depending on the embodiment, this setting may not be editable once an encrypted value of a password has been generated and/or stored.

New Password—refers to data that comprises new password. In an embodiment, a password may be an alphanumeric string (and/or biometric information about the user) with a predetermined length of characters. In some embodiments, the password characters are not visible during or after entry.

New Password Confirmation—refers to the confirmed value for the new password. In an embodiment, it must match the new password setting before the new password is accepted.

Expiry—indicates the date after which the password is no longer valid. A default setting for this value may be provided. After the expiry date, if a user attempts to use the password to gain access to an IED he/she will receive a message such as, "Password has expired." If such a message is received, a valid date must be entered into the security configuration file before the password will be accepted by the IED.

Supervision—refers to a process by which an operating authority can supervise access to one or more IEDs. If the security setting is enabled, a command from SCADA opens a time-window during which the IED will accept the password. The duration of the window may be configurable through a SUPV ACCESS LIMIT setting. If the SCADA command has expired, the password is rejected and a message, such as "Password requires Supervision," is received by the user.

Remote Access—If the remote access setting is enabled, the password may be accepted only for actions requested by a remote computer operated by a user. If the remote access setting is disabled, the password may be valid only for local actions.

Protection Configuration Permission—This permission allows an IED Protection configuration to be modified using the RBAC software that is executed by the remote computer 201.

Load Protection—This permission allows a Protection configuration to be loaded in the IED 100.

Automation Configuration—This permission allows the Automation or Front Panel HMI configurations to be modified using the RBAC software that is executed by the remote computer 201.

Load Automation—This permission allows the Automation configuration to be loaded into the IED 100.

HMI Configuration—This permission allows a Front Panel HMI configuration to be modified using the RBAC software that is executed by the remote computer 201.

Load HMI—This permission allows a HMI configuration to be loaded into the IED 100.

HMI Control—This permission allows a breaker or disconnect switch to be opened and closed. It also allows control of Local-Remote, Substitution, AR Enable/Disable, and User Programmable pushbuttons. In an embodiment, this permission is local only.

HMI Tag—This permission allows substation equipment to be tagged (effectively disabling control of the substation equipment). In an embodiment, this permission is local only.

HMI Bypass Interlock—This permission allows non-interlocked control of a device. In an embodiment, this permission is local only.

EQ Manager Configuration—This permission allows an Equipment Manager configuration to be modified using the RBAC software that is executed by the remote computer 201.

Load EQ Manager—This permission allows the Equipment Manager configuration to be loaded into the IED 100.

EQ Manager Delete/Reset—This permission allows a Breaker Operation record to be deleted from the memory 700 of the IED 100. It also permits Breaker Statistics to be reset.

DFR Configuration—This permission allows the DFR 800 to be modified using the RBAC software that is executed by the remote computer 201.

Load DFR—This permission allows the DFR to be loaded into memory 700 of the IED 100. If Remote Access is enabled, then this permission may only be available remotely. Otherwise, it may be available locally only.

DFR Delete—This permission allows a record to be deleted from memory 700 of the IED, including, but not limited to, a Sequence-Of-Events record, a Transient record, a Disturbance record, or a Fault Report record.

Communications Configuration—This permission allows the Communications configuration to be modified using the RBAC software that is executed by the remote computer 201.

Load Communications—This permission allows the Communications configuration to be loaded into the IED 100.

Security Configuration—This permission allows the Security configuration to be modified using the RBAC software that is executed by a remote computer 201.

Load Security—This permission allows the Security configuration to be loaded into an IED 100.

Security Retrieve Audit Trail—This permission allows the contents of the Security Audit Trail (e.g., access log) to be retrieved from the memory 700 of the IED 100.

Upgrade Firmware—This permission allows firmware to be upgraded in the IED 100.

Test Mode—This permission allows test mode to be enabled. In an embodiment, his permission is local only.

The apparatus, methods, and system for secure access control of an intelligent electronic device ("IED") by multiple personnel, shown and described herein, are illustrative only.

Although only a few embodiments have been described in detail, those skilled in the art who review this disclosure will readily appreciate that substitutions, modifications, changes and omissions may be made in the design, operating conditions and arrangement of the preferred and other exemplary embodiments without departing from the spirit of the embodiments as expressed in the appended claims. Accordingly, the scopes of the appended claims are intended to include all such substitutions, modifications, changes and omissions.

What is claimed is:

1. A method, comprising:
    generating a role for a user of an intelligent electronic device ("IED");
    generating a user assignment;
    generating a site assignment; and
    generating a security key for the user and an associated security file for the IED based on data output from at least one of the steps of generating a role, generating a user assignment, and generating a site assignment.

2. The method of claim 1, further comprising:
    encrypting at least one of the user security key and the associated security file.

3. The method of claim 1, further comprising:
    transmitting the associated security file to the IED.

4. The method of claim 3 further comprising, upon presentment of a user security key to the IED, comparing the presented user security key to the associated security file for the IED to determine user permissions for the IED.

5. The method of claim 4 wherein the associated security file comprises a unique security code that is associated with the role.

6. The method of claim 1, wherein the step of generating a role comprises:
    building the role from one or more basic permissions.

7. The method of claim 1, wherein the step of generating a user assignment comprises:
    assigning a user name to the role; and
    specifying expiry.

8. The method of claim 7, wherein the step of generating a user assignment further comprises:
    enabling or disabling supervision;
    specifying a domain; and
    enabling or disabling remote access.

9. The method of claim 1, wherein the step of generating a site assignment comprises:
    adding a new site profile;
    adding a new IED profile; and
    assigning the new IED profile to the new site profile.

10. A method of operating an IED, comprising:
    receiving an action request;
    checking a received user key against a security file;
    executing an action if permission is granted as a result of the checking step; and
    generating an unauthorized access alarm if permission is denied as a result of the checking step.

11. The method of claim 10, further comprising:
    updating a security log with data, wherein the data is associated with one of the action and the unauthorized access alarm.

12. An apparatus, comprising:
    a microprocessor;
    a circuit managed by the microprocessor and configured to control operation of substation equipment;
    a memory coupled with the microprocessor; and a role-based access control ("RBAC") mechanism configured to be executed by the microprocessor, wherein the role-based access control mechanism is configured to:
    generate a role for a user of an intelligent electronic device ("IED");
    generate a user assignment;
    generate a site assignment; and
    generate a user security key for the user and an associated security file for the IED based on data output from at least one of the steps of generating a role, generating a user assignment, and generating a site assignment.

13. The apparatus of claim 12, wherein the apparatus is an intelligent electronic device ("IED").

14. The apparatus of claim 12, further comprising:
    a security file stored in the memory that when processed by the microprocessor causes the microprocessor to grant role-based user access to the apparatus.

15. The apparatus of claim 14, wherein the security file comprises data that includes:
    at least one of a unique code and unique password; and
    role-based privileges associated therewith.

16. The apparatus of claim 15, wherein the unique code comprises user biometric information.

17. The apparatus of claim 12, wherein the RBAC device comprises:
    one of a USB port, a wireless reader, and a biometric device.

18. The apparatus of claim 17, further comprising:
    one of a removable USB-compatible key and a wireless-compatible key.

19. The apparatus of claim 18, wherein the removable USB-compatible key contains at least one of a unique code and unique password, and wherein the wireless-compatible key contains at least one of the unique code and unique password.

20. The apparatus of claim 12, further comprising:
    a data port for remote access.

21. The apparatus of claim 20, wherein the data port for remote access comprises:
    one of a USB port, an Ethernet port, and a wireless transceiver.

22. A system, comprising:
    an intelligent electronic device ("IED") configured to allow role-based access to a user of the IED;
    a network; and
    a remote computer coupled to the IED via the network, wherein the remote computer is configured to transmit an IED security file to the IED, wherein the IED security file comprises one or more unique security code/passwords, each of which is associated with a role comprised of one or more permissions.

* * * * *